United States Patent
Kipping (10) Patent No.: US 12,151,896 B2
(45) Date of Patent: Nov. 26, 2024

(54) ROLLER CONVEYOR SYSTEM AND METHOD FOR TRANSFERRING A ROLLER CONVEYOR SYSTEM FROM AN OPERATING STATE INTO A MAINTENANCE STATE

(71) Applicants: thyssenkrupp Automotive Body Solutions GmbH, Heilbronn (DE); thyssenkrupp AG, Essen (DE)

(72) Inventor: Tino Kipping, Schmelz (DE)

(73) Assignees: thyssenkrupp Automotive Body Solutions GmbH, Wadern-Lockweiler (DE); thyssenkrupp AG, Essen (DE)

(*) Notice: Subject to any disclaimer, the term of this patent is extended or adjusted under 35 U.S.C. 154(b) by 104 days.

(21) Appl. No.: 17/960,649

(22) Filed: Oct. 5, 2022

(65) Prior Publication Data

US 2023/0112182 A1  Apr. 13, 2023

(30) Foreign Application Priority Data

Oct. 8, 2021 (DE) .................... 10 2021 211 398.2
Dec. 22, 2021 (DE) .................... 10 2021 214 928.6

(51) Int. Cl.
- *B65G 13/02* (2006.01)
- *B65G 13/12* (2006.01)
- *B65G 21/14* (2006.01)

(52) U.S. Cl.
CPC ............. *B65G 13/02* (2013.01); *B65G 13/12* (2013.01); *B65G 21/14* (2013.01)

(58) Field of Classification Search
CPC ......... B65G 21/14; B65G 13/02; B65G 13/12

USPC .... 198/817, 782, 586, 632; 193/35 R, 35 TE
See application file for complete search history.

(56) References Cited

U.S. PATENT DOCUMENTS

| | | | |
|---|---|---|---|
| 3,370,727 A * | 2/1968 | Shaw | B65G 13/00 193/35 R |
| 3,374,878 A * | 3/1968 | Kornylak | B65G 21/14 198/782 |
| 3,857,473 A | 12/1974 | Kornylak | |
| 4,333,788 A * | 6/1982 | Klose | B29D 30/3007 242/615.3 |

(Continued)

FOREIGN PATENT DOCUMENTS

| | | |
|---|---|---|
| DE | 23 28 206 A1 | 1/1975 |
| DE | 33 30 620 A1 | 3/1985 |

(Continued)

*Primary Examiner* — James R Bidwell
(74) *Attorney, Agent, or Firm* — thyssenkrupp North America, LLC (57) ABSTRACT

A roller conveyor system for conveying material may include a frame and roller conveyors arranged on the frame. The roller conveyor system is configurable in an operating state and in a maintenance state. At least one of the roller conveyors is arranged in an operating position in the operating state and in a maintenance position that is different from the operating position in the maintenance state. In the maintenance position, a region is then advantageously freed up, which can be used to perform maintenance. In addition, a method for transferring such a roller conveyor system from an operating state into a maintenance state may involve transferring one of the roller conveyors from the operating position into a maintenance position different from the operating position.

16 Claims, 7 Drawing Sheets

(56) References Cited

U.S. PATENT DOCUMENTS

| | | | |
|---|---|---|---|
| 4,459,732 A | | 7/1984 | Driggers |
| 5,657,857 A | * | 8/1997 | Neilson .................. B65G 15/08 |
| | | | 198/828 |
| 2005/0133346 A1 | * | 6/2005 | Kabeshita .......... H05K 13/0411 |
| | | | 198/817 |
| 2015/0144536 A1 | * | 5/2015 | Dugat ....................... B07C 5/36 |
| | | | 209/552 |
| 2020/0122928 A1 | * | 4/2020 | Bellar .................... B65G 13/11 |
| 2021/0261348 A1 | | 8/2021 | Quaglia et al. |

FOREIGN PATENT DOCUMENTS

| | | |
|---|---|---|
| DE | 279 454 A1 | 6/1990 |
| DE | 298 07 457 U1 | 1/1999 |
| DE | 20 2019 104 015 U1 | 10/2020 |
| JP | S52-96884 U | 7/1977 |

* cited by examiner

ROLLER CONVEYOR SYSTEM AND METHOD FOR TRANSFERRING A ROLLER CONVEYOR SYSTEM FROM AN OPERATING STATE INTO A MAINTENANCE STATE

CROSS REFERENCE TO RELATED APPLICATIONS

This application is a U.S. Non-Provisional application that claims priority to German Patent Application No. DE 10 2021 211 398.2, filed Oct. 8, 2021, and German Patent Application No. DE 10 2021 214 928.6, filed Dec. 22, 2021, the entire contents of both of which are incorporated herein by reference.

FIELD

The present disclosure generally relates to conveyor systems, including roller conveyor systems that convey material and include a frame and roller conveyors arranged on the frame.

BACKGROUND

In the prior art, a roller conveyor system is known for example from DD 279 454 A1. In the known roller conveyor systems, the individual roller conveyors are arranged fixedly on a frame. On the outer sides of such a roller conveyor system, a maintenance region has to remain free in order that maintenance work can be carried out on the roller conveyor system or on components of the roller conveyor system and/or on devices that are arranged beneath the roller conveyor system. Devices that are arranged beneath the roller conveyor system are in particular devices that are associated with the handling and/or processing of the material to be conveyed that is conveyed by the roller conveyor system, for example the drive unit of a robot arm.

Against this background, the problem addressed by the present disclosure is to improve a roller conveyor system mentioned at the beginning, and advantageously to improve it in such a way that the space to the sides of the roller conveyor system is usable but the maintenance work can still be carried out on the roller conveyor system and/or on a device that is arranged beneath the roller conveyor system.

Thus a need exists for a roller conveyor system and a method for transferring a roller conveyor system having roller conveyors arranged on a frame from an operating state into a maintenance state.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to conveyor systems. In some examples, a roller conveyor system for conveying material may include a frame and roller conveyors arranged on the frame. Such a roller conveyor system is sometimes also referred to just as a roller conveyor. The present disclosure also relates to methods for transferring a roller conveyor system having roller conveyors arranged on a frame from an operating state into a maintenance state.

In some examples, a roller conveyor system for conveying material to be conveyed, in particular pallets, crates, components and/or workpiece carriers, may comprise a frame, in particular an underframe, and roller conveyors arranged on the frame, in particular roller conveyors arranged on top of the frame. The roller conveyor system is in this case configured to take up an operating state and a maintenance state, wherein at least one of the roller conveyors is arranged in an operating position in the operating state and the at least one roller conveyor is arranged in a maintenance position different from the operating position in the maintenance state. Rather than the term operating position, the term working arrangement can also be used, and rather than the term maintenance position, the term maintenance arrangement can also be used. In the operating state, the material to be conveyed can advantageously be conveyed. In the maintenance state, maintenance can advantageously be carried out on the roller conveyor system and/or on a device that is arranged beneath the roller conveyor system. The proposed roller conveyor system thus advantageously provides for not all of the roller conveyors of the roller conveyor system to be connected fixedly and non-displaceably to the frame but for at least one roller conveyor of the roller conveyor system to be able to be displaced between an operating position and a maintenance position, in particular to be displaced without tools. Advantageously, as a result of this at least one roller conveyor being arranged in the maintenance position, even when the space around the roller conveyor system is being used, room is available for carrying out maintenance. Thus, in a particularly advantageous configuration of the roller conveyor system, a maintenance region which is blocked by at least one roller conveyor in the operating state is accessible in the maintenance state.

In particular, provision is made for the frame of the roller conveyor system to comprise bearing elements on which the roller conveyors rest. The bearing elements are in this case arranged in particular in succession in a manner spaced apart from one another, in particular at spacings of more than 1000 mm (mm: millimetre), wherein, between the bearing elements, there are advantageously free spaces which can be used in particular for carrying out the maintenance work when the at least one roller conveyor is arranged in the maintenance position. In particular, devices or parts of devices which are available for the handling and/or processing of the material to be conveyed that is conveyed by the roller conveyor system are additionally arranged in the free spaces. In particular, a drive unit for an industrial robot can be arranged at least partially in such a free space beneath the roller conveyors.

The roller conveyors of the roller conveyor system are arranged in particular parallel to one another. Preferably, the roller conveyor system comprises two roller conveyors that are arranged parallel to one another. Advantageously, the roller conveyors are in the form of bars with rollers arranged therein, via which a material to be conveyed can be conveyed. The roller conveyor system preferably comprises a drive unit for driving rollers of the roller conveyors. A material to be conveyed can thus advantageously be conveyed actively on the roller conveyor system. In particular, provision is furthermore made for the roller conveyor system to comprise a first roller conveyor and a second roller conveyor as the roller conveyors. The first roller conveyor is in this case advantageously stationary with respect to the frame. This means that the position of the first roller conveyor cannot be changed with respect to the frame and the first roller conveyor accordingly cannot be transferred into a maintenance position. The first roller conveyor is thus always in an operating position.

In particular, provision is made for the roller conveyor system to be part of a so-called skid system. In this case, the roller conveyor system is configured in particular to convey motors, transmissions and/or vehicle body parts, in particular using a correspondingly configured workpiece carrier.

According to a further advantageous configuration, the roller conveyor system is configured to pivot the at least one roller conveyor, in particular to pivot it relative to the frame. In particular, provision is made for the roller conveyor system to be configured to pivot the second roller conveyor. As a result of the at least one roller conveyor being pivoted, the at least one roller conveyor is advantageously transferred from the operating position into the maintenance position. After maintenance has been completed, the at least one roller conveyor is advantageously transferred back from the maintenance position into the operating position by being pivoted. Advantageously, for pivoting the at least one roller conveyor, the roller conveyor system comprises at least one pivoting device, in particular at least one pivoting arm. The pivoting device is in this case arranged in particular on the frame. According to a further advantageous configuration, the frame comprises at least one pivoting arm, in particular two, three, four or five pivoting arms, wherein the at least one pivoting arm is oriented orthogonally to a longitudinal extension direction of the roller conveyors, and wherein the roller conveyor system is advantageously configured to pivot the at least one roller conveyor by means of the at least one pivoting arm, in particular to pivot it upwards, in particular along a circular path. In particular, provision is made for the second roller conveyor to be pivotable and for the first roller conveyor to be stationary and not pivotable.

In a further advantageous configuration variant of the roller conveyor system, the roller conveyor system is configured to move the at least one roller conveyor in translation, in particular to move it in translation relative to the frame. In particular, provision is made for the second roller conveyor to be movable in translation and for the first roller conveyor to be stationary and not movable in translation. In this case, in order to be transferred from the operating position into the maintenance position, the second roller conveyor is advantageously moved in translation towards the first roller conveyor. As a result of the at least one roller conveyor being moved in translation, the at least one roller conveyor is advantageously transferred from the operating position into the maintenance position. After maintenance has been completed, the at least one roller conveyor is advantageously transferred back from the maintenance position into the operating position by being moved in translation. Advantageously, for moving the at least one roller conveyor in translation, the roller conveyor system comprises at least one translation device. The translation device is in this case arranged in particular on the frame. According to a further advantageous configuration, the frame comprises at least one guide rail, in particular two, three, four or five guide rails, which is/are oriented in particular orthogonally to a longitudinal extension direction of the roller conveyors. The roller conveyor system is in this case advantageously configured to move the at least one roller conveyor in translation via the at least one guide rail. The at least one guide rail may in this case be the at least one translation device. According to one configuration variant, provision is also made for the roller conveyors of the roller conveyor system, in particular the first roller conveyor and the second roller conveyor, to be able to be moved in translation jointly such that the relative position of the roller conveyors with respect to one another remains unchanged. In this configuration variant, the roller conveyors are therefore moved in translation such that at least one of the roller conveyors is no longer arranged directly above the frame in the maintenance position. The guidance via the guide rail can in this case be configured in the form of a sliding guide, in particular in the manner of a tongue and groove connection. In particular, however, provision may also be made for the at least one roller conveyor that is movable in translation, in particular the second roller conveyor, to comprise at least one roller on its underside, which rolls on the guide rail on changing between the operating position and the maintenance position. In particular, provision is made for the at least one roller conveyor that is movable in translation to be arranged on a central guide rail of the frame with a roller attached to its underside and for a sliding guide to be provided on the outer guide rails. According to a further advantageous embodiment, as a result of the movement in translation, it is also possible for a plurality of different working arrangements to be taken up, which are adapted to different widths of material to be conveyed. In particular, it is also possible for a drive unit to be provided in order to transfer the at least one roller conveyor from the operating position into the maintenance position and/or to transfer the at least one roller conveyor from the maintenance position into the operating position.

According to a further advantageous configuration, in which the roller conveyor system comprises a first roller conveyor and a second roller conveyor, the roller conveyor system has a drive unit for driving rollers of the roller conveyors, wherein the drive unit comprises a drive motor which is arranged on the first roller conveyor and with which the rollers of the first roller conveyor can be driven. Advantageously, the first roller conveyor is arranged in a stationary manner with respect to the frame so that the first roller conveyor is particularly suitable for the arrangement of the drive motor. Also advantageously, the drive unit comprises a drive shaft via which the rollers of the second roller conveyor are driven by means of the drive motor. The drive shaft extends in this case in particular from the first roller conveyor to the second roller conveyor. The drive shaft is in this case advantageously guided by the first roller conveyor. In particular, the drive shaft extends orthogonally to a longitudinal extension direction of the roller conveyors. In the event that the second roller conveyor is movable in translation, provision is made in particular for the drive shaft and the second roller conveyor to be configured such that the second roller conveyor can be moved in translation via the drive shaft, wherein the drive shaft projects through the second roller conveyor.

According to an advantageous configuration variant, provision is made for the drive shaft to be telescopic. Advantageously, the drive shaft is pushed together when the second roller conveyor is transferred from the operating position into the maintenance position and is accordingly pulled apart when the second roller conveyor is transferred from the maintenance position into the operating position.

In a further advantageous configuration variant, the drive shaft comprises a first drive-shaft portion and a second drive-shaft portion, wherein the first drive-shaft portion and the second drive-shaft portion are connected together via a joint, in particular a universal joint. Advantageously, it is thus possible, before the second roller conveyor is transferred from the operating position into the maintenance position, for the drive shaft to be detached from the second roller conveyor and for the drive shaft to be moved out of the displacement path of the second roller conveyor by means of the joint. Advantageously, the first drive-shaft portion is connected to the first roller conveyor and the second drive-shaft portion is connected to the second roller conveyor, wherein the first drive-shaft portion is advantageously much shorter than the second drive-shaft portion and so the forces that act on the first drive-shaft portion are advantageously low when the second drive-shaft portion has been swung out into the maintenance state via the joint.

Advantageously, the drive shaft has a connecting element for connecting the drive shaft to the second roller conveyor, wherein the connection is detachable in order to transfer the second roller conveyor into the maintenance position. Advantageously, the drive shaft can be connected easily to the second roller conveyor again by means of the connecting element when the second roller conveyor has been transferred back into the operating position from the maintenance position following maintenance. Advantageously, the connecting element allows the connection of the drive shaft to the second roller conveyor to be detached and re-established without tools.

According to a further advantageous configuration, the roller conveyor system comprises a securing unit which is configured to secure the at least one roller conveyor against unintentional displacement in the operating position and/or in the maintenance position. Thus, safe operation of the roller conveyor system in the operating state and safe execution of maintenance in the maintenance state are advantageously possible because accidental transfer of the at least one roller conveyor out of the operating position or out of the maintenance position is prevented. By actuation and thus undoing the securing, it is advantageously possible to displace the roller conveyor or move it in translation. In particular, provision is made for the securing unit to comprise at least one sensor which signals when the at least one roller conveyor, in particular the second roller conveyor is in the maintenance position and/or when the at least one roller conveyor, in particular the second roller conveyor, is in the operating position. Also advantageously, the securing unit comprises a locking device, wherein, to transfer the at least one roller conveyor from the operating position or from the maintenance position, advantageously a lock has to be released.

In particular a roller conveyor system for conveying material to be conveyed, comprising an underframe and a first roller conveyor arranged on the underframe and a second roller conveyor arranged on the underframe, is provided, wherein the second roller conveyor is movable in translation relative to the underframe. According to a further configuration, the first roller conveyor is also movable in translation relative to the underframe, wherein, according to a configuration variant, the first roller conveyor is stationary with respect to the underframe. In particular, the second roller conveyor is arranged parallel to the first roller conveyor. Advantageously, the roller conveyor system comprises ad drive unit for driving rollers of the first roller conveyor and/or of the second roller conveyor, wherein the drive unit advantageously comprises a drive motor which is arranged on the first roller conveyor and with which the rollers of the first roller conveyor are driven. Also advantageously, the drive unit comprises a drive shaft via which the rollers of the second roller conveyor are driven by means of the drive motor. In a further advantageous configuration, the underframe comprises at least one guide rail, in particular two, three, four or five guide rails, which is/are oriented orthogonally to the first roller conveyor and the second roller conveyor and orthogonally to a longitudinal extension direction of the roller conveyor system, wherein the first roller conveyor and/or the second roller conveyor, advantageously only the second roller conveyor, is arranged so as to be movable in translation via the guide rail. Advantageously, the roller conveyor system can be transferred from a working arrangement into a maintenance arrangement or from a maintenance arrangement into a working arrangement by moving the first roller conveyor in translation and/or by moving the second roller conveyor in translation. In particular, the roller conveyor system comprises a securing unit which is configured to secure the first roller conveyor and/or the second roller conveyor against unintentional movement in translation in the working arrangement and/or in the maintenance arrangement.

In the method, also proposed, for transferring a roller conveyor system having roller conveyors arranged on a frame from an operating state into a maintenance state, wherein the roller conveyors are arranged in an operating position in the operating state, at least one of the roller conveyors is transferred from the operating position into a maintenance position different from the operating position. As a result of the at least one roller conveyor being transferred from the operating position into a maintenance position different from the operating position, the roller conveyor system is thus advantageously displaced from the operating state, in which material to be conveyed can be conveyed by the roller conveyor system, into the maintenance state, in which maintenance can be carried out on the roller conveyor system and/or on a device that is arranged beneath the roller conveyor system.

According to an advantageous configuration of the method, the at least one roller conveyor is pivoted from the operating position into the maintenance position, in particular by means of at least one pivoting device of the roller conveyor system. According to a further advantageous configuration of the method, the at least one roller conveyor is moved in translation from the operating position into the maintenance position, in particular by means of at least one translation device of the roller conveyor system, in particular using at least one guide rail on which the at least one roller conveyor is arranged so as to be movable in translation.

Provision is also advantageously made for a securing unit to be actuated before the at least one roller conveyor is transferred from the operating state into the maintenance state, said securing unit being configured to secure the at least one roller conveyor against unintentional displacement in the operating position and/or in the maintenance position. Only by actuating the securing unit is displacement of the at least one roller conveyor advantageously allowed, in particular pivoting and/or moving in translation.

In a further advantageous configuration of the method, a drive shaft which connects the roller conveyors together in order to drive rollers of the at least one roller conveyor is separated from the at least one roller conveyor, in particular by disconnecting a connecting element provided therefor, before the at least one roller conveyor is transferred from the operating position into the maintenance position.

Advantageously, the drive shaft is additionally removed from the displacement path along which the at least one roller conveyor is transferred from the first operating position into the maintenance position. This can take place in particular by pushing together a telescopic drive shaft. Alternatively, the drive shaft can be removed from the displacement path of the at least one roller conveyor in particular by pivoting a second drive-shaft element, which is connected to a first drive-shaft element via a joint, in particular via a universal joint.

Furthermore, provision is advantageously made with regard to the method for the roller conveyor system to be a roller conveyor system according to the invention, in particular a roller conveyor system having the above-described features, which can be realized individually or in combination in the roller conveyor system.

In particular, a method is provided in which a roller conveyor system which has a first roller conveyor arranged on a frame and a second roller conveyor arranged on the frame parallel to the first roller conveyor is transferred from an operating state into a maintenance state by the following method steps being carried out: shutting down the roller conveyor system in the operating state, in particular by switching off the drive unit; if present, removing material to be conveyed that is located on the roller conveyor system; releasing a drive shaft connected to the second roller conveyor; actuating a securing unit, in particular releasing a locking mechanism, in order for it to be possible to move the second roller conveyor out of the operating position; moving the second roller conveyor in translation relative to the frame towards the first roller conveyor until it is in the maintenance position; securing the second roller conveyor in the maintenance position, in particular by actuating a securing unit, in particular a locking mechanism.

In order to transfer the roller conveyor system from the maintenance state back into the operating position, the abovementioned steps are advantageously carried out in the reverse order. In particular, the following method steps are provided: actuating a securing unit, in particular releasing a locking mechanism, in order for it to be possible to move the second roller conveyor out of the maintenance position; moving the second roller conveyor in translation relative to the frame away from the first roller conveyor until it reaches the operating position; securing the second roller conveyor in the operating position, in particular by actuating a securing unit, in particular a locking mechanism; connecting the drive shaft to the second roller conveyor, wherein this step can in particular also be provided before the second roller conveyor is secured in the operating position, in particular when it is possible to move the second roller conveyor beyond the operating position in order to make it easier to connect the drive shaft to the second roller conveyor; starting the drive unit of the roller conveyor system. Advantageously, a sensor system is used to monitor whether the second roller conveyor has been secured correctly in the operating position, for example via a contact switch. If the monitoring indicates that the second roller conveyor has not been correctly secured in the operating position, start-up of the roller conveyor system is advantageously prevented or operation of the roller conveyor system is stopped.

In the various figures, identical parts are generally provided with the same reference signs and illustrated in the same way and are therefore also, in some cases, each explained only in conjunction with one of the figures.

Figure 1:
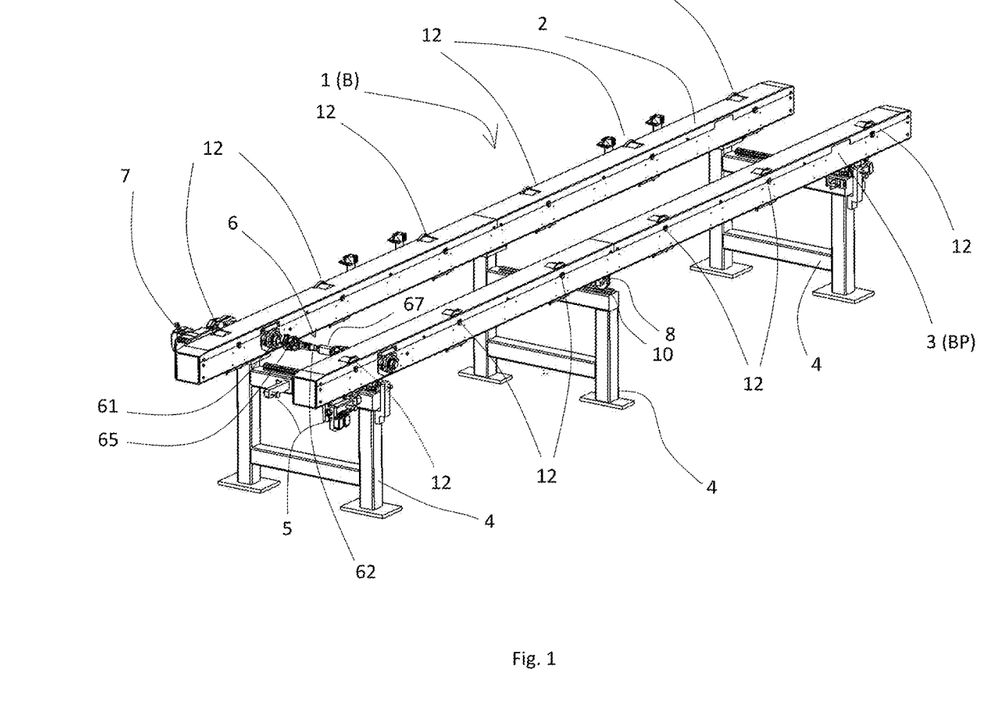
FIG. 1 is a perspective view of an exemplary embodiment of a roller conveyor system in an operating state.
Figure 2:
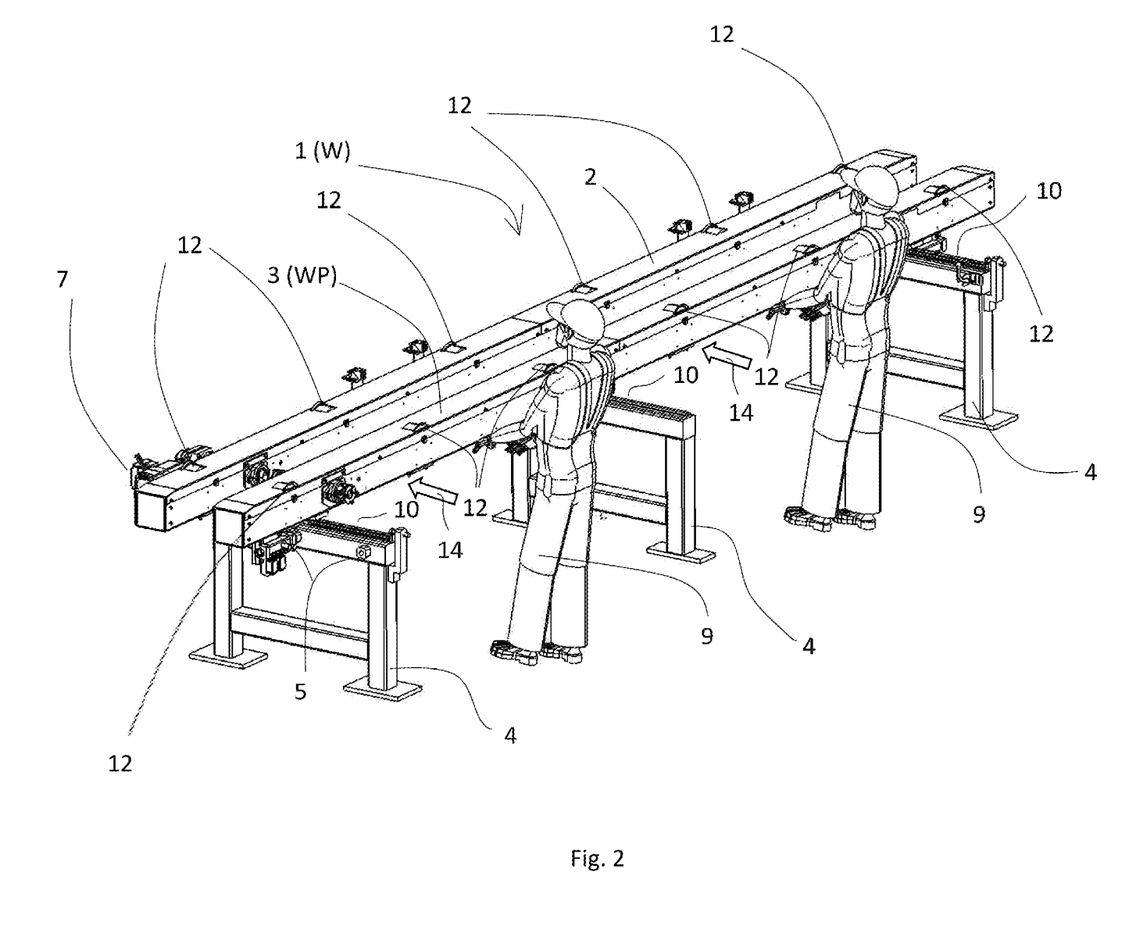
FIG. 2 is a perspective view of the exemplary embodiment of a roller conveyor system according to FIG. 1 in a maintenance state.
Figure 3:
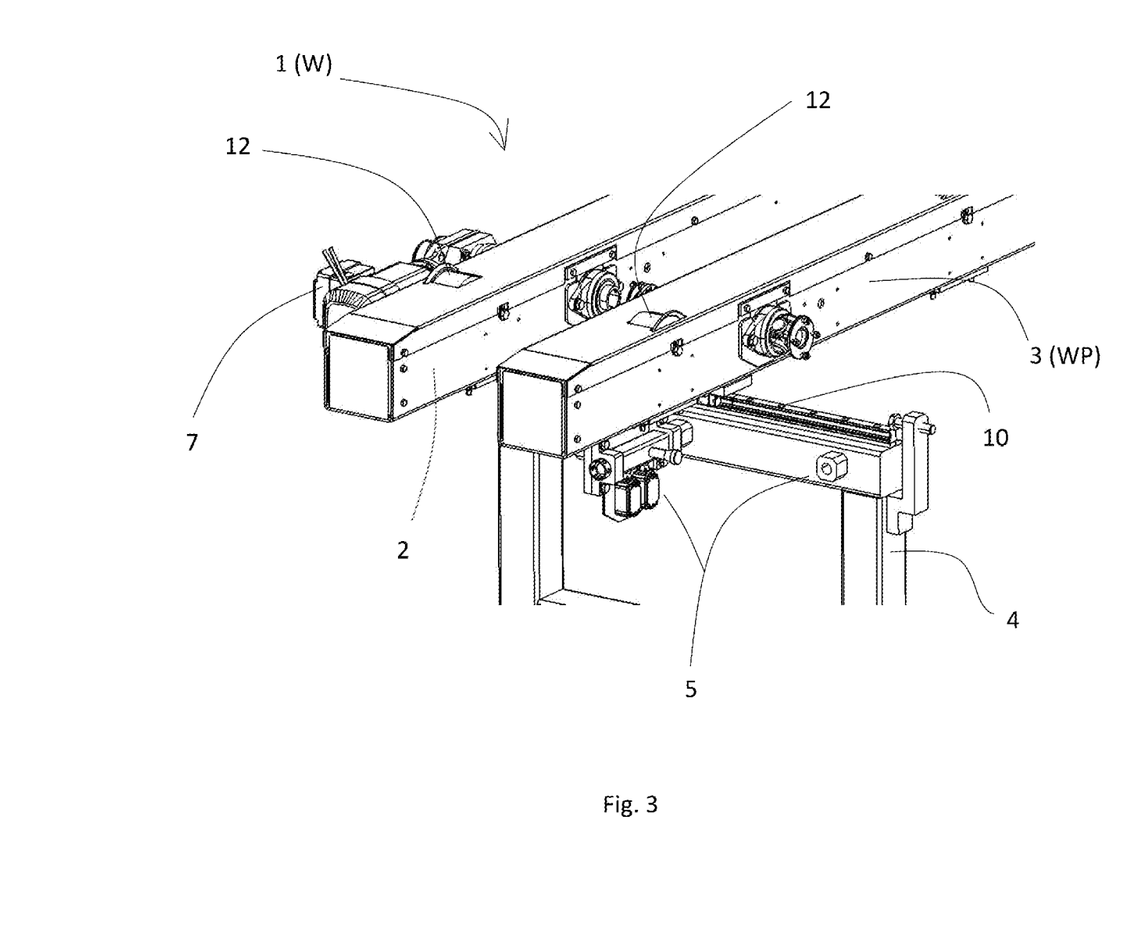
FIG. 3 is a further perspective view of a detail of the exemplary embodiment of a roller conveyor system according to FIG. 2.

FIG. 1 to FIG. 3 show an exemplary embodiment of a roller conveyor system 1 which is configured to be transferred from an operating state B into a maintenance state W, and vice versa, and is thus configured to take up an operating state B and a maintenance state W. In FIG. 1, the roller conveyor system 1 is shown in an operating state B, wherein, in the operating state B, the roller conveyor system 1 is configured to convey material to be conveyed. FIG. 2 and FIG. 3 show the roller conveyor system 1 in the maintenance state W, wherein an enlarged detail from FIG. 2 is illustrated in FIG. 3.

The roller conveyor system 1 comprises a frame 4, on which a first roller conveyor 2 and, parallel thereto, a second roller conveyor 3 are arranged. The frame 4 of the roller conveyor system 1 is in the form of an underframe and comprises, in this exemplary embodiment, three bearing elements on which the roller conveyors 2, 3 rest. The bearing elements are arranged in succession, wherein the spacings between the individual bearing elements measure more than one metre in this exemplary embodiment.

The roller conveyors 2, 3 of the roller conveyor system 1 are each in the form of bars with rollers 12 arranged therein, via which a material to be conveyed can be conveyed. For the active conveying of material to be conveyed by means of the roller conveyor system 1, the roller conveyor system comprises a drive unit for driving the rollers 12. The drive unit comprises a drive motor 7 arranged on the first roller conveyor 2 and a drive shaft 6, via which the rollers 12 of the second roller conveyor 2 are driven by the drive motor 7. In particular, the roller conveyor system 1 according to this exemplary embodiment is configured, in the operating state B, to convey so-called skids as material to be conveyed. A skid is in this case in particular a frame which comprises two runners and is configured to receive vehicle body assemblies. The runners are coordinated with the roller conveyor system 1 such that in each case one runner rests on the respective roller conveyor 2, 3 and a skid can accordingly be conveyed by the roller conveyor system 1.

The first roller conveyor 2 of the roller conveyor system 1 is stationary with respect to the frame 4 in this exemplary embodiment. This means that even when the roller conveyor system 1 is transferred from the operating state B into the maintenance state W, the position of the first roller conveyor 2 does not change in this exemplary embodiment. The first roller conveyor 2 could also be said to be permanently arranged in an operating position.

By contrast, the second roller conveyor 3 is movable in translation relative to the frame 4. In this case, the second roller conveyor 3 is arranged in an operating position BP in the operating state B and in a maintenance position WP different from the operating position BP in the maintenance state W. In order to move the second roller conveyor 3 in translation, guide rails 10 are arranged on each of the bearing elements of the frame 4, said guide rails thus being oriented orthogonally to the longitudinal extension direction of the roller conveyors 2, 3. In this exemplary embodiment, in the region of the guide rail 10 which is arranged on the central bearing element of the frame 4, a roller 8, which runs on the guide rail 10, is arranged under the second roller conveyor 3. In the region of the guide rails 10 arranged on the outer bearing elements of the frame 4, the second roller conveyor 3 has guide elements which cooperate with the guide rails 10. This means that, to change between the operating position BP and the maintenance position WP of the second roller conveyor 3, the roller 8 rolls along the central guide rail 10, wherein the second roller conveyor is guided by the lateral guide rails 10. The roller conveyor system 1 is configured such that the second roller conveyor 3 can be moved in translation via the guide rails 10.

FIG. 2 shows by way of example how maintenance personnel 9 move the second roller conveyor 3 in translation and thus transfer the roller conveyor system 1 from the operating state B into the maintenance state W. In the maintenance state W, a maintenance region 11 is accessible, which is blocked by the second roller conveyor 3 in the operating state B. The free spaces between the bearing elements of the frame 4 can advantageously be used to carry out maintenance work when the second roller conveyor 3 is arranged in the maintenance position WP. In particular, devices or device components of devices are arranged in the free spaces beneath the roller conveyors, wherein it is possible to use these devices to process in particular the vehicle body parts transported on the skids.

In order for it to be possible to safely convey material to be conveyed by means of the roller conveyor system 1 and for it to be possible to safely carry out maintenance in the maintenance state W, the roller conveyor system 1 comprises, in this exemplary embodiment, a securing unit 5, which secures the second roller conveyor 3 against unintentionally moving in translation. In this exemplary embodiment, the securing unit 5 is in the form of a locking mechanism, which automatically locks the second roller conveyor 3 in the operating position BP and in the maintenance position WP and thus secures it against moving in translation. In order that the second roller conveyor 3 can be moved in translation, it is thus necessary for the locking mechanism first to be actuated and the lock released. In this exemplary embodiment, the securing unit 5 additionally comprises, in the operating position BP and in the maintenance position WP, in each case one contact sensor (not explicitly shown in the figures), wherein the contact sensor is used to monitor that the second roller conveyor 3 is correctly arranged in the operating position BP or in the maintenance position WP and has been secured against unintentionally moving in translation.

Figure 4:
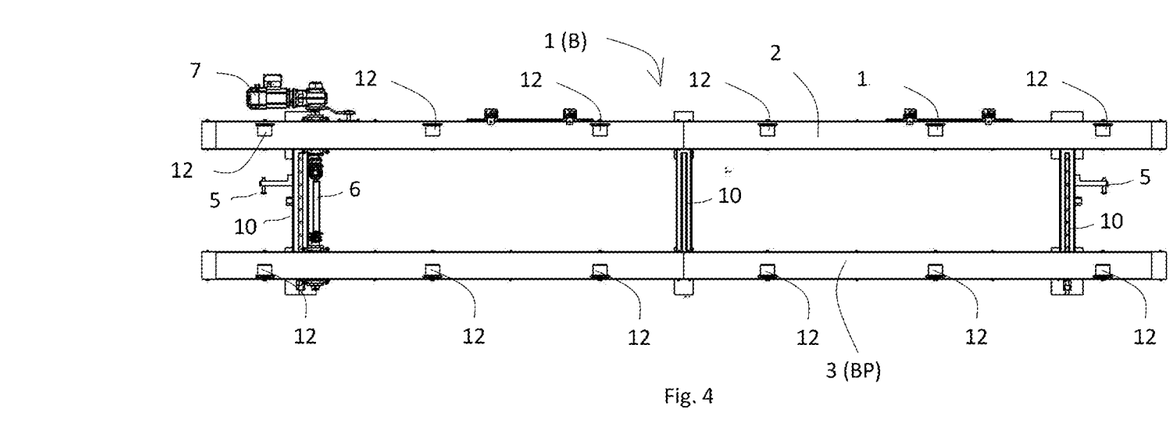
FIG. 4 is a plan view of a further exemplary embodiment of a roller conveyor system in an operating state.
Figure 5:
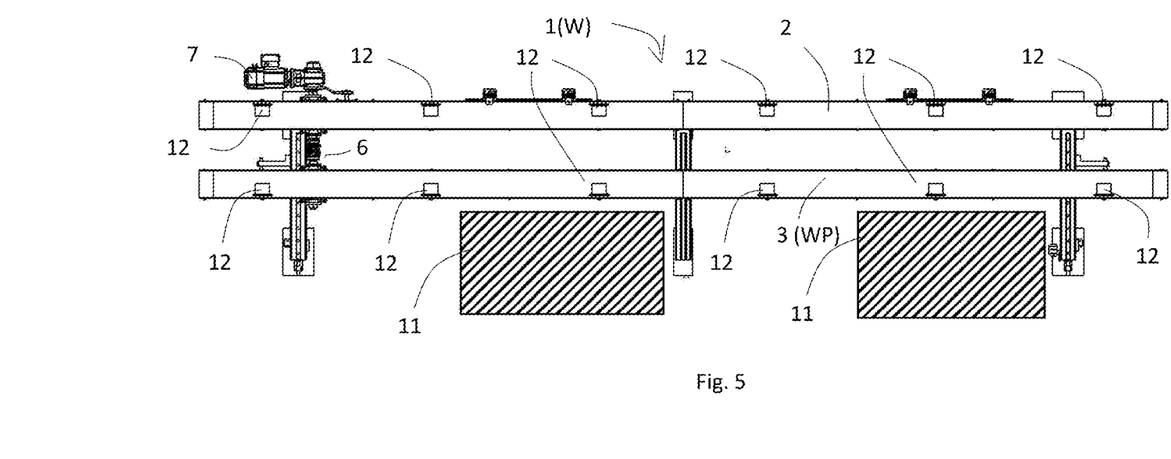
FIG. 5 is a plan view of the exemplary embodiment of the roller conveyor system according to FIG. 4 in a maintenance state.

FIG. 4 and FIG. 5 show a further exemplary embodiment of a roller conveyor system 1 in a plan view, with a first roller conveyor 2 and a second roller conveyor 3 that is movable in translation, wherein FIG. 4 shows the roller conveyor system 1 in the operating state B and FIG. 5 shows the roller conveyor system 1 in the maintenance state W. In FIG. 5, a maintenance region 11 freed up by the movement of the second roller conveyor 3 in translation is illustrated by hatching. In contrast to the exemplary embodiment explained with reference to FIG. 1 to FIG. 3, the drive unit of the roller conveyor system 1 shown in FIG. 4 and FIG. 5 has a telescopic drive shaft 6. This is pushed together when the second roller conveyor 3 is moved in translation from the operating position BP into the maintenance position WP and is correspondingly pulled apart when the second roller conveyor 3 is moved in translation from the maintenance position WP into the operating position BP.

Figure 6:
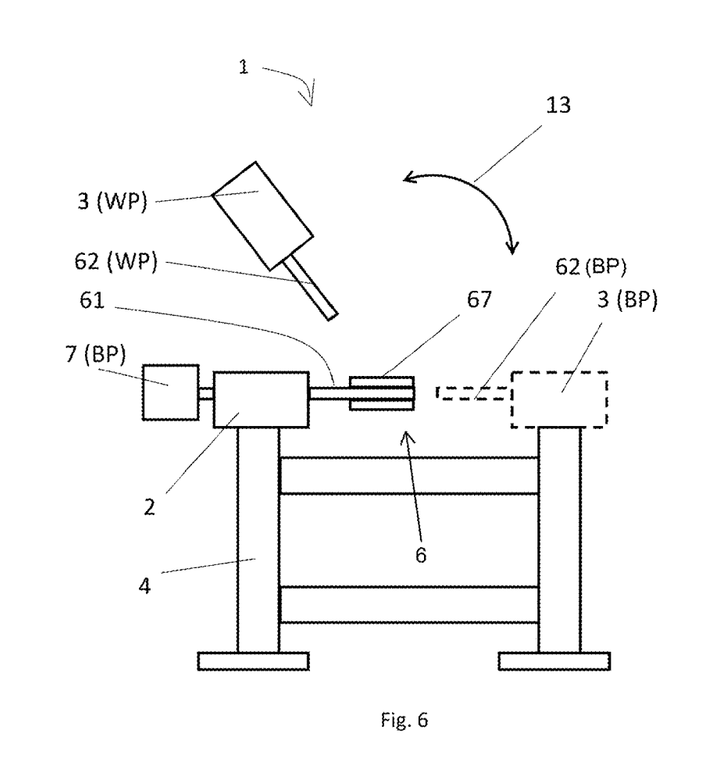
FIG. 6 is a front, schematic view in a longitudinal extension direction of a further exemplary embodiment of a roller conveyor system.

FIG. 6 shows an exemplary embodiment of a roller conveyor system 1 according to the invention for conveying material to be conveyed, comprising a frame 4, wherein a first roller conveyor 2 and a second roller conveyor 3 are arranged on the frame 4.

The roller conveyor system 1 comprises a drive unit with a drive motor 7 and a drive shaft 6, said drive motor and drive shaft being used to drive rollers of the roller conveyors 2, 3. In the roller conveyor system 1, the first roller conveyor 2 is stationary with respect to the frame 4. By contrast, the second roller conveyor 3 is pivotable, meaning that the second roller conveyor 3 can be pivoted by a pivoting movement 13 from an operating position BP into a maintenance position WP and can be pivoted from the maintenance position WP into the operating position BP. As a result of the second roller conveyor 3 being pivoted into the respective position BP, WP, the roller conveyor system 1 is configured to take up an operating state B and a maintenance state W. In particular, provision is also made in this configuration variant for the second roller conveyor 3 to be able to be secured against unintentional displacement in the respective position BP, WP. In particular, provision is made for the roller conveyor system 1 to comprise, for the pivoting of the second roller conveyor 3, a pivoting device, although the latter is not explicitly illustrated in FIG. 6. As a result of the second roller conveyor 3 being pivoted upwards, a maintenance region is freed up.

In the exemplary embodiment illustrated in FIG. 6, the drive shaft 6 of the drive unit of the roller conveyor system 1 comprises a first drive-shaft portion 61, a second drive-shaft portion 62 and a connecting element 67 in the form of a clutch, which connects the first drive-shaft portion 61 to the second drive-shaft portion 62. Via the connecting element 67 and the second drive-shaft portion 62, the drive shaft 6 is connected to the second roller conveyor 3. The connecting element 67 is configured such that the connection between the first drive-shaft portion 61 and the second drive-shaft portion 62 can be released when the second roller conveyor 3 is intended to be transferred from the operating position BP into the maintenance position WP. Since the second drive-shaft portion 62 is arranged on the second roller conveyor 3, it is likewise pivoted from its operating position BP into a maintenance position WP when the second roller conveyor 3 is pivoted 13. Once the second roller conveyor 3 and thus the second drive-shaft portion 62 has been transferred back into the operating position from the maintenance position, the second drive-shaft portion 62 can be connected to the first drive-shaft portion 61 again by means of the connecting element 67. In this exemplary embodiment, the connecting element 67 allows the connection of the first drive-shaft portion 61 to the second drive-shaft portion 62 to be released and re-established without tools. The correct connection of the drive-shaft portions 61, 62 via the connecting element 67 is advantageously monitored by a sensor system.

In a configuration variant, it is also possible to provide as the connecting element 67 a universal joint with which the second drive-shaft portion 62 can be swung out when the drive shaft 6 is released from the second roller conveyor 3. The connecting element 67 is then advantageously arranged closer to the first roller conveyor 2 in order to reduce lever forces acting on the first drive-shaft portion 61. In order for it to be possible to release the drive shaft 6 better from the second roller conveyor 3, provision may be made for the second roller conveyor 3 to also be able to be transferred from the operating position BP into a further position, in which the second roller conveyor 3 is spaced apart further from the first roller conveyor 2, meaning that the spacing between the second roller conveyor 3 and the first roller conveyor 2 has been increased. From this further position, the second roller conveyor 3 is then transferred into the maintenance position WP.

Figure 7:
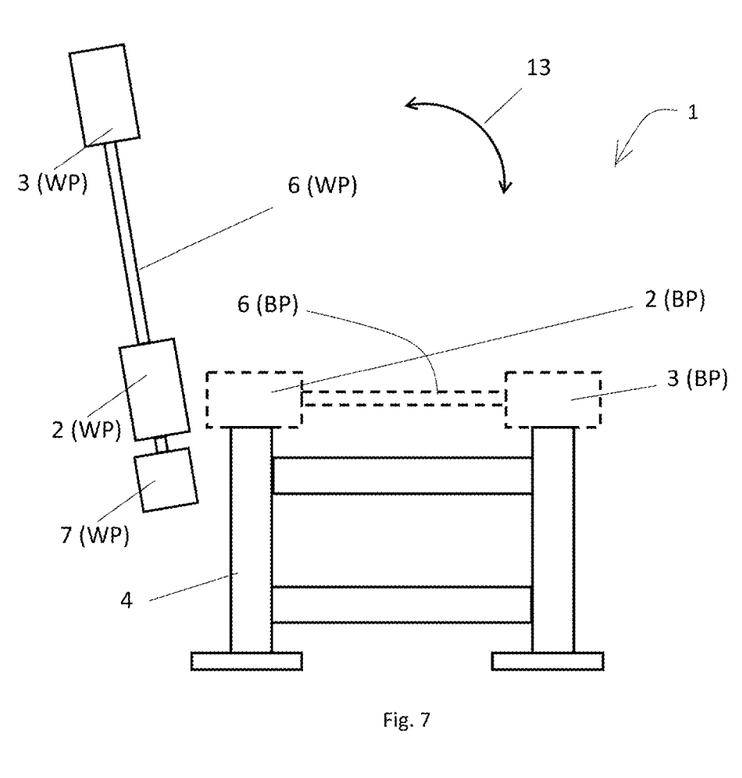
FIG. 7 is a front, schematic view in the longitudinal extension direction of a further exemplary embodiment of a roller conveyor system.

A further exemplary embodiment of a roller conveyor system 1 which is configured to take up an operating state B and a maintenance state W is illustrated in FIG. 7. As in the exemplary embodiment explained with reference to FIG. 6, this roller conveyor system 1 has a first roller conveyor 2 and a second roller conveyor 3, which are arranged on a frame 4. In contrast to the exemplary embodiment according to FIG. 6, this roller conveyor system 1 is configured, however, to pivot the first roller conveyor 2 and the second roller conveyor 3 jointly in a pivoting movement 13 in order to transfer the roller conveyors 2, 3 from an operating position BP into a maintenance position WP. For pivoting the roller conveyors 2, 3, the roller conveyor system 1 comprises a pivoting device (not explicitly illustrated in FIG. 7). During the pivoting of the first roller conveyor 2 and of the second roller conveyor 3, the position thereof relative to the frame 4 changes. The position of the first roller conveyor 2 relative to the second roller conveyor 3 remains unchanged, however. Therefore, in this exemplary embodiment, the drive shaft 6 is formed in a continuous manner since it, and also the drive motor 7 arranged on the first roller conveyor 2, is pivoted together with the roller conveyors 2, 3 from the respective operating position BP into the maintenance position WP and, respectively, from the respective maintenance position WP into the operating position BP. In order to provided a clearer illustration, the drive motor is illustrated only in the maintenance position WP and not in the operating position BP in FIG. 7.

Figure 8:
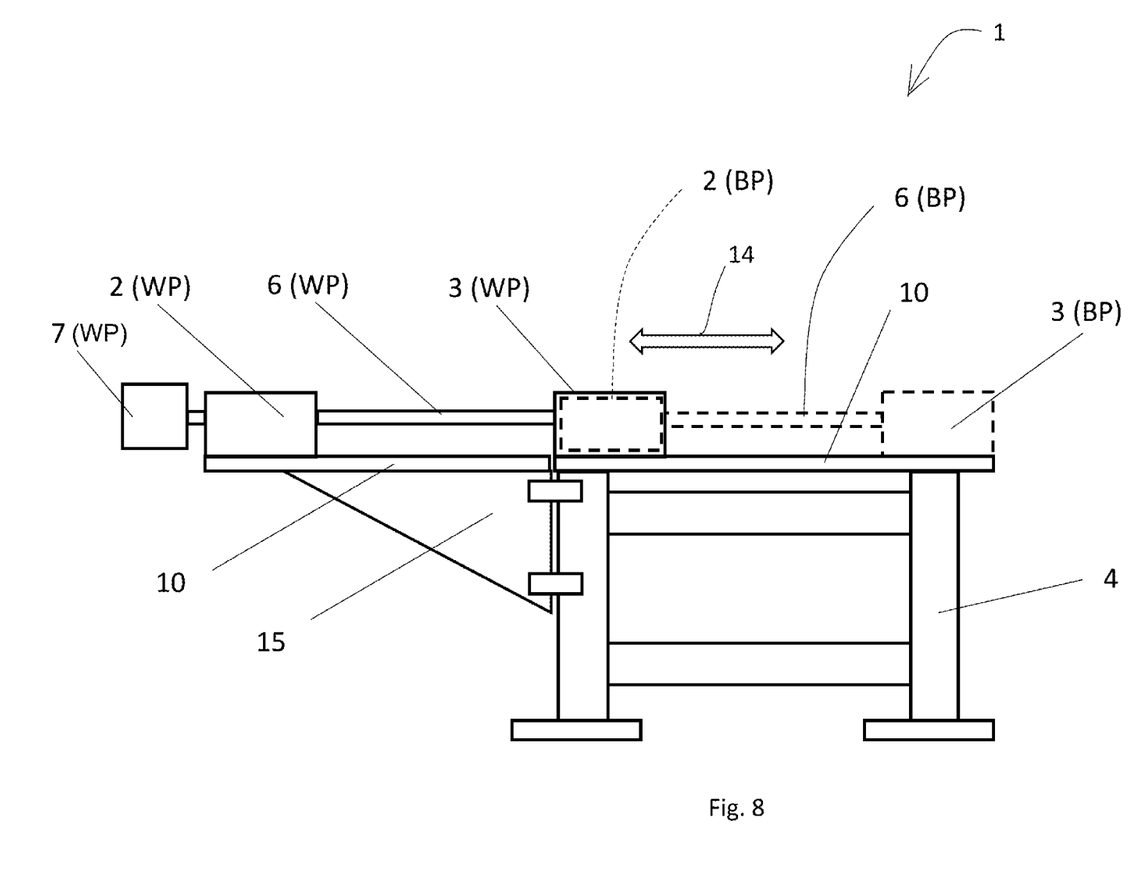
FIG. 8 is a front, schematic view in the longitudinal extension direction of a further exemplary embodiment of a roller conveyor system.

In a configuration variant of the roller conveyor system 1 that is illustrated in FIG. 8, the first roller conveyor 2 and the second roller conveyor 3, in contrast to the exemplary embodiment according to FIG. 7, are not pivoted jointly, but rather the roller conveyor system 1 is configured to jointly move the first roller conveyor 2 together with the second roller conveyor 3 in translation with respect to the frame 4 in a movement in translation 14 in order for it to be possible to transfer the roller conveyor system 1 into an operating state B and into a maintenance state W. For the roller conveyors 2, 3 to be moved in translation, they are arranged on guide rails 10, wherein, in this exemplary embodiment, the first roller conveyor 2 can be moved in translation beyond the actual frame 4 in a maintenance position WP via pivotable brackets 15, on each of which a guide rail 10 is likewise arranged. The maintenance position WP of the second roller conveyor 3 can then correspond in particular to the operating position BP of the first roller conveyor 2. In this exemplary embodiment, too, components of the drive unit, in particular the drive motor 7 arranged on the first roller conveyor 2 and the drive shaft 6 arranged between the first roller conveyor 2 and the second roller conveyor 3, are moved in translation together with the roller conveyors 2, 3 into a maintenance position WP or into an operating position BP. In order to provided a clearer illustration, the drive motor is illustrated only in the maintenance position WP and not in the operating position BP in FIG. 8.

Figure 9:
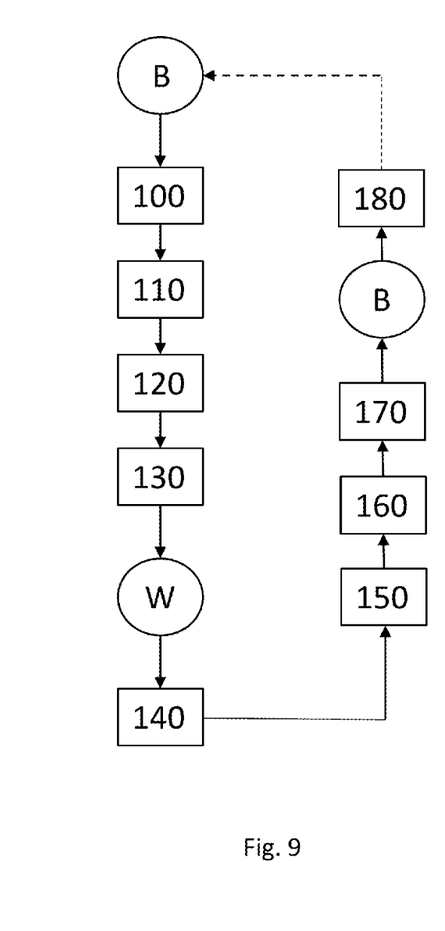
FIG. 9 is a block diagram representing an exemplary embodiment of a method for transferring a roller conveyor system from an operating state into a maintenance state.

With reference to FIG. 9, by way of example, a method for transferring a roller conveyor system 1 having roller conveyors 2, 3 arranged on a frame 4 from an operating state B into a maintenance state W and from a maintenance state back into an operating state B is explained, wherein provision is made in this exemplary embodiment for the roller conveyor system 1 to be configured as shown in FIG. 7 or in FIG. 8. In the method, the roller conveyor system 1 in operation is shut down in a first method step 100, in particular by switching off the drive motor 7. In a further method step 110, a locking mechanism is released to undo the securing of the roller conveyors 2, 3 in the operating position BP. In a method step 120, the roller conveyors 2, 3 are then transferred from the operating position BP into the maintenance position WP, in particular by being pivoted 13 or being moved in translation 14. Then, in a method step 130, the locking mechanism is locked to secure the roller conveyor 2, 3 in the maintenance position WP. The roller conveyor system 1 is now in the maintenance state W. In a further method step 140, maintenance is now carried out. After the maintenance has been completed, the roller conveyor system 1 is transferred back from the maintenance state W into the operating state B. To this end, in a method step 150, the locking mechanism is released to undo the securing of the roller conveyors 2, 3 in the maintenance position WP. In a method step 160, the roller conveyors 2, 3 are then transferred from the maintenance position WP into the operating position BP. The roller conveyors 2, 3 arranged in the operating position BP are then secured in the operating position BP. To this end, in a method step 170, the locking mechanism is locked to secure the roller conveyors 2, 3 in the operating position BP. In a further method step 180, the roller conveyor system 1 in the operating state B is operated again to convey material to be conveyed, in particular skids, in particular by starting the drive motor 7.

The exemplary embodiments illustrated in the figures and explained in conjunction therewith serve to explain the inventions and have no limiting effect thereon.

LIST OF REFERENCE SIGNS

1 Roller conveyor system
2 First roller conveyor
3 Second roller conveyor
4 Frame
5 Securing unit
6 Drive shaft
61 First drive-shaft portion
62 Second drive-shaft portion
65 Joint of the drive shaft
67 Connecting element of the drive shaft
7 Drive motor
8 Roller
9 Maintenance personnel
10 Guide rail
11 Maintenance region
12 Roller of a roller conveyor
13 Arrow for symbolically illustrating a pivoting movement 14 Arrow for symbolically illustrating a movement in translation
15 Bracket (pivotable)
B Operating state
W Maintenance state
BP Operating position
WP Maintenance position
100 Shutting down the roller conveyor system
110 Releasing the locking mechanism
120 Transferring the at least one roller conveyor from the operating position into the maintenance position
130 Locking the locking mechanism
140 Carrying out the maintenance
150 Releasing the locking mechanism
160 Transferring the at least one roller conveyor from the maintenance position into the operating position
170 Locking the locking mechanism
180 Starting up the roller conveyor system

What is claimed is:

1. A roller conveyor system for conveying material, wherein the roller conveyor system is configurable in an operating state and in a maintenance state, the roller conveyor system comprising:
a frame;
a first roller conveyor positioned on the frame, the first roller conveyor including a first tube and first rollers at least partially within the first tube; and
a second roller conveyor positioned on the frame, the second roller conveyor including a second tube and second rollers at least partially within the second tube,
wherein the second roller conveyor is arranged in an operating position in the operating state of the roller conveyor system and the second roller conveyor is arranged in a maintenance position that is different from the operating position in the maintenance state of the roller conveyor system.

2. The roller conveyor system of claim 1 wherein a maintenance region that is blocked by at least one of the roller conveyors in the operating state is accessible in the maintenance state.

3. The roller conveyor system of claim 1 configured to pivot the second roller conveyor.

4. The roller conveyor system of claim 1 configured to move the first roller conveyor in translation.

5. The roller conveyor system of claim 4 wherein the frame comprises a guide rail that is oriented orthogonally to the roller conveyors, wherein the roller conveyor system is configured to move the second roller conveyor in translation via the guide rail.

6. The roller conveyor system of claim 1 wherein the first roller conveyor is stationary with respect to the frame.

7. The roller conveyor system of claim 1 comprising a drive unit for driving rollers of the roller conveyors, wherein the drive unit comprises a drive motor that is arranged on the first roller conveyor and that is configured to drive the rollers of the first roller conveyor.

8. The roller conveyor system of claim 7 wherein the drive unit comprises a drive shaft via which the rollers of the second roller conveyor are drivable via the drive motor.

9. The roller conveyor system of claim 8 wherein the drive shaft is telescopic.

10. The roller conveyor system of claim 8 wherein the drive shaft comprises a first drive-shaft portion and a second drive-shaft portion, wherein the first drive-shaft portion and the second drive-shaft portion are connected together via a joint.

11. The roller conveyor system of claim 8 wherein the drive shaft includes a connecting element for connecting the drive shaft to second roller conveyor in a connection, wherein the connection is detachable for transferring the second roller conveyor into the maintenance position.

12. The roller conveyor system of claim 1 comprising a securing unit that is configured to secure the second roller conveyor against unintentional displacement in at least one of the operating position or the maintenance position.

13. A method for transferring a roller conveyor system having roller conveyors arranged on a frame from an operating state into a maintenance state, wherein each of the roller conveyors includes a tube and rollers at least partially within the tube, wherein the roller conveyors are arranged in an operating position in the operating state, comprising:
transferring at least one of the roller conveyors from the operating position into a maintenance position that is different from the operating position.

14. The method of claim 13 comprising pivoting and/or moving the at least one roller conveyor in translation from the operating position into the maintenance position.

15. The method of claim 13 wherein a drive shaft that connects the roller conveyors together in order to drive rollers of the at least one roller conveyor is separated from the at least one roller conveyor before the at least one roller conveyor is transferred from the operating position into the maintenance position.

16. The method of claim 13 wherein the roller conveyors are arranged in operating positions in the operating state of the roller conveyor system and the roller conveyors are arranged in maintenance positions that are different from the operating positions in the maintenance state of the roller conveyor system.

* * * * *